Dec. 20, 1927.

T. H. THOMAS 1,653,132

ELECTROPNEUMATIC BRAKE

Filed Feb. 23, 1927

INVENTOR
THOMAS H. THOMAS
BY Wm. M. Cady
ATTORNEY

Patented Dec. 20, 1927.

1,653,132

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed February 23, 1927. Serial No. 170,071.

This invention relates to electro-pneumatic brakes and more particularly to a brake equipment for electrically controlling the brakes on a locomotive and cars in a train.

The principal object of my invention is to provide an improved electro-pneumatic brake equipment of the type in which the brakes are controlled by current flow through a single train wire.

Figure 1:
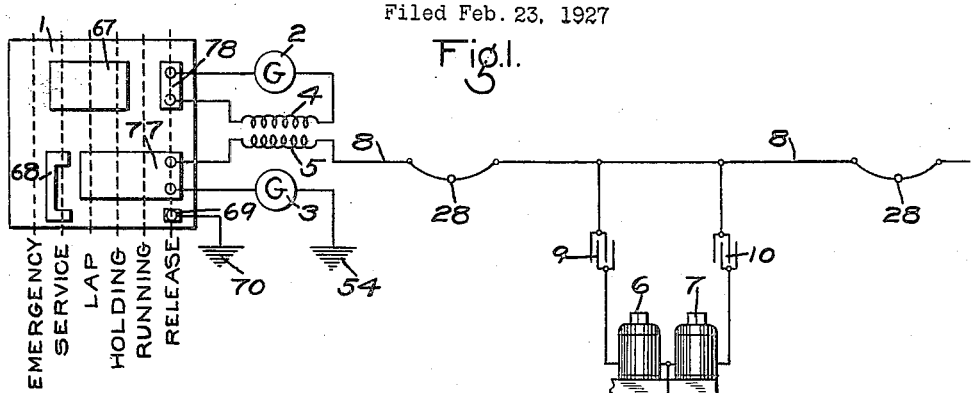

In the accompanying drawing; Fig. 1 is a diagrammatic view of an electro-pneumatic brake equipment embodying my invention; and Fig. 2 is a sectional, diagrammatic view of the pneumatic equipment employed on each car and having associated therewith the electric controlling means.

As shown in Fig. 1 of the drawing, the electric equipment on the locomotive comprises a brake switch device 1, an alternating current generator 2, an alternating current generator 3, each of different cycles, such as 25 and 60 cycles respectively, and a transformer having a primary coil 4 and a secondary coil 5. The electric equipment on each car may comprise a magnet valve device 6 and a magnet valve device 7, each connected in parallel with a single train wire 8 and having in the branch circuit to each magnet valve device, condensers 9 and 10, respectively.

Figure 2:
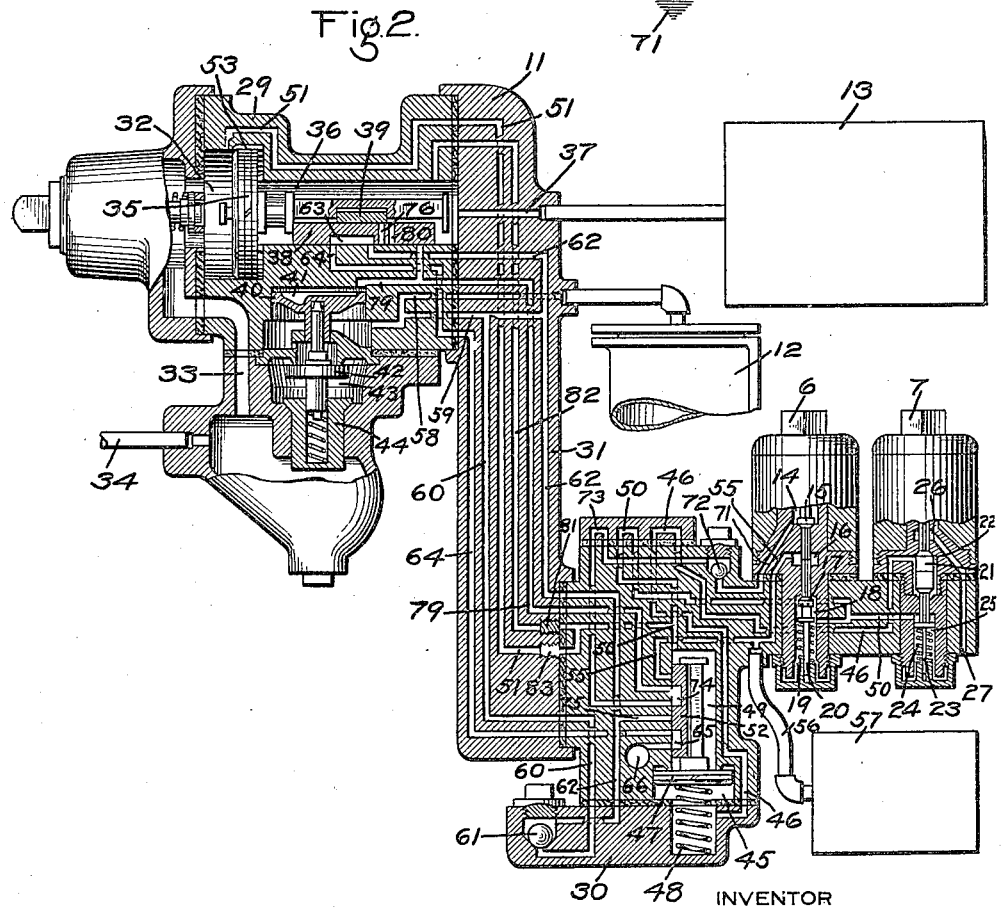

As shown in Fig. 2 of the drawing; the magnet valve devices 6 and 7 on each car are associated with a pneumatic valve device 11, including the usual brake cylinder 12 and auxiliary reservoir 13.

The brake switch device 1, shown in development in Fig. 1, comprises a contact drum, adapted to be rotated through the several positions shown and in each position to make the electrical connections shown. The brake switch device may be built integral with the usual automatic brake valve device and is adapted to operate simultaneously with the brake valve device.

The 25 cycle alternating current generator 2 is connected in series with the transformer primary coil 4 and the circuit is controlled by the connections in the brake switch 1. The 60 cycle alternating current generator 3 is adapted to be connected in series with the transformer secondary coil 5 and the train wire 8 and its circuit is controlled by the connections in the brake switch 1.

The magnet valve device 6 comprises a magnet and is provided with a chamber 14 containing a valve 15, said valve having a fluted stem extending through a suitable bore in a wall of the casing and engaging in a chamber 16 the fluted stem of a valve 17, contained in chamber 18. Also contained in chamber 18 is a spring 19 adapted to engage the collar of a stem 20 which is adapted to engage the valve 17. The valves 15 and 17 are adapted to be operated by the magnet 6.

The magnet valve device 7 comprises a magnet adapted to operate the double beat valve 21 contained in chamber 22, the lower valve having a fluted stem extending through a bore in the wall of the casing and engaging the collar of a stem 23. Said collar being acted upon by a spring 24 contained in chamber 25. The fluted stem of the upper valve extends through a chamber 26 which is connected to the atmosphere through the exhaust passage 27.

The condenser 9, in circuit with the magnet 6, is of such capacity as to provide a resonant circuit only when subject to a current of 60 cycle frequency such as supplied by the alternating current generator 3 and the magnet valve device 6 will be operated only when current at 60 cycles frequency is supplied through the train wire 8.

The condenser 10, in series with the magnet 7, is adapted to provide a resonant circuit only when subject to a current of 25 cycles frequency such as supplied by the alternating current generator 2 and the magnet valve device 7 will be operated only at a frequency of 25 cycles.

The single train wire 8 is adapted to be connected between cars and the locomotive by suitable electrical connectors or jumpers 28, so as to provide one continuous train wire throughout the train.

The pneumatic valve device 11 is similar to that disclosed in my prior Patent No. 1,440,421, granted January 2, 1923, and may comprise a quick action triple valve device 29, a selector valve portion 30, and a pipe bracket 31 having faces to which said triple valve device and selector valve portion are applied.

The quick action triple valve device 29 comprises a casing having a piston chamber 32 connected through passage 33 to the usual brake pipe 34 and containing a piston 35, and a valve chamber 36 connected through passage 37 to the auxiliary reservoir 13 and containing a main slide valve 38 and an auxiliary slide valve 39, adapted to be operated by said piston.

The quick action portion of the triple valve device comprises the usual quick action piston 40, contained in chamber 41, and a brake pipe vent valve 42, contained in chamber 43 and adapted to be operated by said piston. The usual check valve 44 is also contained in chamber 43.

The selector valve portion 30 comprises a casing having a piston chamber 45, connected through passage 46 to chamber 22 containing the double beat valve 21, and containing a piston 47 subject to the pressure of a coil spring 48, and having a valve chamber 49, connected through passages 50 and 51 to the triple valve piston chamber 32, and containing a slide valve 52 adapted to be operated by said piston.

The magnet valve devices 6 and 7 are mounted on a bracket integral with the selector valve portion casing 30.

In operation the fluid pressure brake system is charged in the usual manner and fluid from the brake pipe 34 flows to piston chamber 32 of the triple valve device 29 and thence through the feed groove 53 to valve chamber 36 and through passage 37 to the auxiliary reservoir 13.

Fluid under pressure is supplied from the brake pipe and piston chamber 32 of the triple valve device 29, through passages 51 and 50 to the selector valve chamber 49 and to the spring chambers 18 and 25.

In the running position of the brake valve and brake switch 1, the alternating current generator 3 is connected to the single train wire 8 through contact 27 of the brake switch 1 and a current of 60 cycles frequency is supplied to the train wire. The condenser 9 and magnet 6 forming a resonant circuit only with a 60 cycle current, the magnet 6 is energized and the magnet 7 is deenergized. The circuit is closed through the ground 71 on the cars.

The magnet 7 being deenergized, the double beat valve 21 is seated in its upper position, thereby permitting fluid under pressure in spring chamber 25 to flow into valve chamber 22 and thence through passage 46 to the selector valve piston chamber 45, wherein the pressure equalizes with the opposing pressure in valve chamber 49, so that the pressure of spring 48 holds the selector valve piston 47 and slide valve 52 in release position, as shown in the drawing.

The magnet 6 being energized, the valve 15 is seated and the valve 17 is unseated, which permits fluid at brake pipe pressure in chamber 18 to flow past the valve 17 to chamber 16 and thence through passage 55 and pipe 56 to the reservoir 57, charging said reservoir. Passage 55 also leads to the seat of the selector slide valve 52 but is lapped by the slide valve in release position.

In release position of the selector valve and the triple valve slide valves, the brake cylinder 12 is connected to the atmosphere through passages 58, 59, 60, past the ball check valve 61, passage 62, cavity 63 in the main slide valve 38 of the triple valve device 29, passage 64, cavity 65 in the selector valve slide valve 52, and the atmospheric exhaust passage 66.

If it is desired to effect a service application of the brakes, the brake valve and brake switch 1 is turned to service position, in which the brake pipe pressure is reduced through the brake valve device in the usual manner. The circuit of the 25 cycle generator 2 is closed through the contact 67 in the brake switch 1 and the 25 cycle current in the primary coil 4 is induced in the secondary coil 5 of the transformer. The circuit of the 60 cycle alternating current generator 3 is broken in service position and the train wire 8, connected to the secondary transformer coil 5, is connected through contact 68 and 69 to the ground 70 on the locomotive. The condenser 10 and magnet 7 forming a resonant circuit only with a current of 25 cycles frequency, the magnet 7 becomes energized and the magnet 6 is deenergized.

Energization of magnet 7 seats the double beat valve 22 in its lower position and closes communication between chambers 25 and 22 and connects chamber 22 to chamber 26. Fluid under pressure from the selector valve piston chamber 45 is then vented to the atmosphere through passage 46, the double beat valve chamber 22, and chamber 26 to the atmospheric exhaust passage 27, which permits the fluid pressure in valve chamber 49 to shift the selector valve piston and slide valve downwardly to service position, against the pressure of spring 48. In service position, the brake cylinder passage 64 is lapped by the slide valve 52 and passage 55 is uncovered, so that valve chamber 49 is connected to passage 55.

The magnet 6 being deenergized, the valve 17 is seated and the valve 15 is unseated, which permits fluid under pressure from the brake pipe to be vented to the brake cylinder 12, through passages 51 and 50, selector valve chamber 49, passage 55, reservoir 57, chamber 16 in the magnet valve device 6, past the valve 15, thence through passage 71, past ball check valve 72, through passage 73, cavity 74 in the selector valve slide valve 52, passages 75, 62, 59 and 58 to the brake cylinder 12.

The brake pipe pressure is therefore locally reduced on each car by operation of the magnet 6, and is also reduced by the automatic brake valve device, so that the triple valve devices on the train are shifted to service position, in which the usual service port 76 in the main slide valve 38 registers with the brake cylinder passage 62 and fluid under pressure is supplied from the valve chamber 36 and the auxiliary reservoir 13 to the brake cylinder 12, in the usual manner.

If it is desired to limit the degree of brake cylinder pressure and therefore of the brake application, the brake switch and brake valve are moved to lap position, in which the circuit of the 25 cycle alternating current generator 2 is closed through the contact 67 of the brake switch 1 and thereby induces a current of 25 cycles frequency in the train wire 8, which energizes the magnet 7 and maintains the double beat valve 22 and the selector piston and slide valve in service positon. The circuit of the 60 cycle alternating current generator 3 is also closed through contact 77 of the brake switch 1, so that a current of 60 cycles frequency is also supplied to the train wire 8 and operates to energize the magnet 6, so that the magnet operates to unseat the valve 17 and seat the valve 15, and thereby further flow of fluid under pressure to the brake cylinder 12 is prevented.

The brake valve device being in lap position prevents any further change in brake pipe pressure, so that when the pressure of the fluid in the auxiliary reservoir 13 becomes reduced by flow to the brake cylinder, to a degree slightly less than the pressure of the fluid in the brake pipe, the triple valve piston and auxiliary slide valve are shifted to lap position.

The brake cylinder pressure may be increased in steps as desired by alternately moving the brake valve and switch between service and lap positions, as will be evident.

The brakes may be released by first moving the brake valve and switch to release position and then to running position. In release position, fluid is supplied from the main reservoir through the brake valve device to the brake pipe in the usual manner, to secure a rapid increase in brake pipe pressure and thereby cause the movement of the triple valves to release position.

In release position, the brake switch operates to close the circuit of the 60 cycle alternating current generator 3 through contact 77 of the brake switch 1 and to close the circuit of the 25 cycle alternating current generator 2 through contact 78 of the brake switch 1, so that both the magnets 6 and 7 are energized, the same as in lap position, so that while the selector piston and slide valve are maintained in their lower position, communication from the brake pipe to the brake cylinder is cut off by the closing of the valve 15.

When the brake pipe pressure has been increased, in release position of the brake valve and switch, sufficiently to effect the movement of the triple valve to release position, the brake valve may be turned to running position in which the circuit of the 25 cycle alternating current generator 2 is opened, so that the magnet 7 is deenergized and the pressure of spring 24 shifts the double beat valve 22 to its upper position, in which brake pipe fluid from the selector valve chamber 49 is supplied through passage 50 to chamber 25, past the valve 21 and thence through passage 46 to the selector piston chamber 45. The piston 47 and slide valve 52 are then shifted to release position, in which the brake cylinder is connected to the atmospheric exhaust passage 66.

If the brake valve and switch are left in running position, the brakes will be fully released, but if it is desired to effect a graduated release of the brakes, the brake valve and switch may be moved from running to release position, after the brake cylinder pressure has been partially reduced, so as to cut off the further exhaust of fluid from the brake cylinder. Further reductions in brake cylinder pressure may then be effected by moving the brake valve and switch between running and release position, as will be evident.

The electrical connections on the brake switch are the same in holding position as in lap and release position, so that if desired, the brake valve and switch may be moved between running and holding or lap positions, to produce a graduated release of the brakes. The use of holding position may be desired under certain conditions to prevent overcharge of the brake pipe, since in holding position the brake pipe is charged through the usual feed valve device.

An emergency application of the brakes may be effected by moving the brake valve and switch to emergency position, in which the brake pipe pressure is suddenly reduced at the brake valve and in which both the electric circuits are opened, so that the magnets 6 and 7 are deenergized.

Since the magnet 7 is deenergized, the piston 47 of the selector valve device will be maintained in release position, the supply of fluid under pressure to the piston chamber 45 being maintained past the open double beat valve 21.

The magnet 6 being deenergized, the valve 17 is closed and the valve 15 opened, so that fluid under pressure is supplied from the normally charged reservoir 57 to the quick action piston 40 of the triple valve device through pipe 56, passage 55, chamber 16, valve chamber 14, passage 71, check valve 72, passage 73, cavity 74 in the selector slide valve 52, passage 79 and thence to the quick action piston chamber 41.

Said piston then operates to open the brake pipe vent valve 42 and vent chamber 43 to the brake cylinder. The fluid under pressure in the brake pipe then lifts the check valve 44 and flows into chamber 43 and thence to the brake cylinder, to effect a local reduction in brake pipe pressure in the usual manner. The triple valve device is thereby quickly shifted to emergency position, in which the emergency port 80 registers with the brake cylinder passage 62, so that the fluid under pressure in the auxiliary reservoir 13 is permitted to equalize into the brake cylinder.

If a car equipped with the above described apparatus is placed in a train not provided with electric control, the magnets 6 and 7 will both be deenergized, so that the valve 17 will be seated, cutting off the supply of fluid from the brake pipe to the reservoir 57, while the valve 15 will be opened, and fluid in said reservoir will be vented to the chamber above the quick action piston 40 and thence to the brake cylinder 12.

Since there is no fluid pressure in the reservoir 57 under the above conditions, there will be no action of the electric portion and the equipment of the train will operate only pneumatically in the usual manner.

As hereinbefore described, the apparatus operates both electrically and pneumatically, that is to say, the brake pipe pressure is reduced in electric operation and the triple valve devices operate by the reduction in brake pipe pressure to supply fluid to the brake cylinder.

If it is desired to operate electrically only, without having the triple valve devices function, a plug 81 in passage 82 leading from the valve chamber 36 to the passage 50 is removed and placed in the threaded opening 83 in the passage 51, so as to close the brake pipe passage 51 and open the auxiliary reservoir passage 82.

With this arrangement it will be seen that upon operation of the electric portion, fluid under pressure will be taken from the auxiliary reservoir instead of from the brake pipe in making an application of the brakes. In this case, the electric switch 1 operates independently of the usual automatic brake valve device, so that no reduction in brake pipe pressure is effected in electric service position.

In making an electric service application of the brakes, the auxiliary reservoir pressure tends to be reduced by flow to the brake cylinder, but the pressure in said reservoir will be substantially maintained by flow from the brake pipe through feed groove 53, on account of the automatic brake valve device remaining in running position in which fluid under pressure is supplied to the brake pipe in the usual manner.

In Fig. 1 of the drawing, the electro-pneumatic brake apparatus is shown applied only to a car, and not to the locomotive. Said apparatus may, if desired, be also employed on the locomotive, and particularly in case of purely electric control, it would be desirable to equip the locomotive.

In the foregoing description I have mentioned the use of two alternating current generators of 25 and 60 cycle frequency. I do not desire to restrict my invention to the use of such frequencies, since any two different frequencies may equally well be employed, it being understood that the magnets and condensers will then be so designed as to provide the required resonant circuits to correspond with the cycle frequencies employed.

Having now described my invention, what I claim as new and desire to secure by Letters Patent, is:—

1. In an electro-pneumatic brake, the combination with a single train wire and electrically controlled means operated by current supplied from said train wire for controlling the brakes, of two alternating current generators, adapted to supply current at different frequencies to said train wire.

2. In an electro-pneumatic brake, the combination with a single train wire and electrically controlled means operated by current supplied from said train wire for controlling the brakes, of two alternating current generators, one adapted to supply current at one frequency to said train wire and the other adapted to supply current at a different frequency to said wire.

3. In an electro-pneumatic brake, the combination with a single train wire of electrically controlled devices for controlling the brakes, one responsive only to current supplied at one frequency through said wire and the other responsive only to current at another frequency, and generators for supplying current at the different frequencies to said train wire.

4. In an electro-pneumatic brake, the combination with a single train wire, of electrically controlled devices arranged on parallel circuit with said train wire for controlling the brakes, a condenser in circuit with each device adapted to permit flow of alternating current through each device only at different frequencies, and electric generators for supplying alternating current at the different frequencies to said train wire.

5. In an electro-pneumatic brake, the combination with a single train wire and electrically controlled devices operable by alternating current supplied at different frequencies to said train wire, of a transformer having a primary and a secondary coil, an electric generator adapted to be connected through the secondary coil to said train wire, and a second generator adapted to supply current to said primary coil.

6. In an electro-pneumatic brake, the combination with a single train wire and electrically controlled devices operable by alternating current supplied at different frequencies to said train wire, of a transformer having a primary and a secondary coil, an alternating current generator adapted to supply current at one frequency through the secondary coil to said train wire, and a second alternating current generator adapted to supply current at a different frequency to said primary coil.

In testimony whereof I have hereunto set my hand.

THOMAS H. THOMAS.